(12) United States Patent
Zhidkov et al.

(10) Patent No.: US 7,801,249 B2
(45) Date of Patent: Sep. 21, 2010

(54) CARRIER PHASE AND SYMBOL TIMING RECOVERY CIRCUIT FOR AN ATSC RECEIVER AND METHOD OF RECOVERING A CARRIER PHASE AND A SYMBOL TIMING IN RECEIVED DIGITAL SIGNAL DATA

(75) Inventors: Sergey Zhidkov, Suwon-si (KR); Min-ho Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1442 days.

(21) Appl. No.: 11/146,030

(22) Filed: Jun. 7, 2005

(65) Prior Publication Data

US 2006/0078070 A1 Apr. 13, 2006

(30) Foreign Application Priority Data

Oct. 7, 2004 (KR) ...................... 10-2004-0079958

(51) Int. Cl.
*H04L 27/00* (2006.01)
*H03D 3/18* (2006.01)
(52) U.S. Cl. .................... 375/326; 375/327; 375/324
(58) Field of Classification Search ................ 375/326, 375/324, 322, 316
See application file for complete search history.

(56) References Cited

U.S. PATENT DOCUMENTS 5,793,818 A    8/1998    Claydon et al.
5,878,088 A    3/1999    Knutson et al.
5,894,334 A *  4/1999    Strolle et al. ................. 348/725
5,898,665 A *  4/1999    Sawahashi et al. ........... 370/342
6,104,682 A *  8/2000    Konishi ..................... 369/44.34
6,781,541 B1 * 8/2004    Cho ......................... 342/25 D
2001/0017902 A1  8/2001  Yamagata et al.
2003/0123591 A1 * 7/2003  Walker ........................ 375/355
2006/0007571 A1 * 1/2006  Pan et al. ..................... 360/39

FOREIGN PATENT DOCUMENTS

WO        WO 95/26101        9/1995

OTHER PUBLICATIONS

Office Action dated May 19, 2006 for corresponding Korean Application No. 10-2004-0079958 and English translation thereof.

* cited by examiner

*Primary Examiner*—David C Payne
*Assistant Examiner*—Brian J Stevens
(74) *Attorney, Agent, or Firm*—Harness, Dickey & Pierce, P.L.C.

(57) ABSTRACT

A carrier phase and symbol timing recovery circuit and method may be used for robust synchronization in a broadcasting ATSC receiving system. Carrier phase and symbol timing offsets may be simultaneously adjusted by using redundancy information contained in an ATSC signal spectrum. A desired sampling time instant and carrier phase offset for synchronization may be simultaneously obtained due to correlation between carrier phase and symbol timing detectors.

31 Claims, 12 Drawing Sheets

S CURVE OF PHASE ERROR DETECTOR

S CURVE OF TIMING ERROR DETECTOR

CARRIER PHASE AND SYMBOL TIMING RECOVERY CIRCUIT FOR AN ATSC RECEIVER AND METHOD OF RECOVERING A CARRIER PHASE AND A SYMBOL TIMING IN RECEIVED DIGITAL SIGNAL DATA

PRIORITY STATEMENT

This application claims the priority of Korean Patent Application No. 10-2004-0079958, filed on Oct. 7, 2004, in the Korean Intellectual Property Office, the disclosure of which is incorporated herein in its entirety by reference.

BACKGROUND OF THE INVENTION

1. Field of the Invention

The present invention is generally related to a carrier phase and symbol timing recovery circuit used for a High Definition Television (HDTV) receiver operating in accordance with a standard of the Advanced Television System Committee (ATSC), and to a method of recovering a carrier phase and a symbol timing in received digital signal data.

2. Description of the Related Art

ATSC receiving systems may be designed to operate even in severe multi-path environments, such as cities for example. In multi-path environments, substantially strong ghost signals may occur due to reflection of electromagnetic waves from buildings, etc. Therefore, in order to operate stably in severe multi-path environments, ATSC receiving systems should have substantially robust carrier phase and symbol timing recovery circuits and/or processing schemes.

In order to increase bandwidth efficiency in a digital transmission system and the ATSC 8 Vestigial Side Band (VSB) transmission system proposed in accordance with the North America digital television (DTV) transmission standard, only data signals are carried on a transmission signal. In other words, transmission sides do not transmit clock information used for data recovery. Therefore, reception sides should generate clocks similar to those used by the transmission sides in order to recover data from received signals which contain only data. The process is performed by what is referred to as a timing recovery unit. In addition, in order to recover transmitted data, it is desirable to accurately generate the phase of the carrier transmitted at the time of recovering carrier-removed data from the received data. The process is performed by what is referred to as a carrier phase recovery unit.

In general in the conventional art, carrier phase and symbol timing recovery processes may be performed separately. In addition, a phase locked loop (PLL) may be used for the carrier phase recovery process, and a segment synchronization-based algorithm or a Gardner algorithm may be used for the symbol timing recovery process. The Gardner algorithm uses redundancy information in what is referred to as an upper overlapped region.

On the other hand, ATSC receiving systems are based on offset-modulation formats. Therefore, it may be substantially difficult to design a phase recovery circuit which does not depend on a symbol timing offset. Similarly, it is not possible to design a symbol timing recovery circuit completely independent of a phase offset.

Conventionally, several approaches have been used for avoiding complicated correlation between carrier phase and symbol timing recovery circuits. For example, carrier phase and symbol timing recovery circuits may be used in respective wide and narrow bands in order to stabilize the associated operations of ATSC demodulators. However, it is difficult for conventional recovery circuits to completely separate the carrier phase recovery process from the symbol timing recovery process.

SUMMARY OF THE INVENTION

An example embodiment of the present invention is directed to a carrier phase and symbol timing recovery circuit for recovering a carrier phase and a symbol timing in received digital signal data. The circuit may include a pilot-based error detector detecting a first phase error based on a pilot signal included in the received digital signal data, a lower error detector detecting a second phase error based on data in a lower overlapped region where a lower portion of an information-containing signal included in the received digital signal data overlaps a replica of the information-containing signal, and an upper detector detecting a third phase error based on data in an upper overlapped region where an upper portion of the information-containing signal overlaps a replica of the information-containing signal. The circuit may include a first calculation unit determining a carrier phase offset value from the detected first, second and third phase errors, and a second calculation unit determining a symbol timing offset value from the detected first, second and third phase errors. A desired sampling time instant and carrier phase offset may be detected at a point where the determined carrier phase offset and symbol timing offset values are each zero, so as to simultaneously recover a carrier phase and a symbol timing in the received digital signal data.

Another example embodiment of the present invention is directed to a method of recovering a carrier phase and a symbol timing in received digital signal data. In the method, first, second and third phase errors may be detected based on one or more of a pilot signal and an information-containing signal included in the received digital signal data. A carrier phase offset value and a symbol timing offset value may be determined as a function of the detected first, second and third phase errors. A desired sampling time instant and carrier phase offset may be detected at a point where the determined carrier phase offset and symbol timing offset values are each zero, so as to simultaneously recover a carrier phase and a symbol timing in the received digital signal data.

Another example embodiment of the present invention is directed to a circuit for recovering a carrier phase and a symbol timing in received digital signal data. The circuit may include a first error detector detecting a first phase error, a second error detector detecting a second phase error and a third error detector detecting a third phase error. First and second addition/subtraction units may determine a respective carrier phase offset value and a symbol timing offset value as a function of the detected first, second and third phase errors. A desired sampling time instant and carrier phase offset may be detected at a point where the determined carrier phase offset and symbol timing offset values are each zero, so as to simultaneously recover a carrier phase and a symbol timing in the received digital signal data.

Another example embodiment of the present invention is directed to a circuit for recovering a carrier phase and a symbol timing in received digital signal data. The circuit may include an error detector generating a first phase error, means for generating a second phase error and means for generating a third phase error. The third phase error may be equal to the second phase error. First and second addition/subtraction units may determine a respective carrier phase offset value and a symbol timing offset value as a function of the detected first, second and third phase errors. A desired sampling time instant and carrier phase offset may be detected at a point where the determined carrier phase offset and symbol timing offset values are each zero, so as to simultaneously recover a carrier phase and a symbol timing in the received digital signal data.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments the present invention.

DETAILED DESCRIPTION OF THE EXAMPLE EMBODIMENTS

As will be described in more detail below, example embodiments of the present invention may provide a carrier phase and symbol timing recovery circuit for an ATSC receiver, and method for recovering a carrier phase and a symbol timing in received digital signal data. The example circuits and method may be capable of performing a carrier phase and symbol timing recovery process jointly (i.e., simultaneously) without having to avoid correlation between carrier phase and symbol timing recovery circuits. The example circuits and methodology may use all the redundancy information existing in an ATSC signal for both carrier phase and symbol timing synchronizations, so as to simultaneously perform carrier phase and symbol timing recovery processes in the ATSC receiver. The redundancy information may exist in a pilot signal, an upper overlapped region and a lower overlapped region.

The pilot signal may be embodied as a high-power impulse signal added to each data symbol in order to facilitate data recovery. The upper overlapped region may be a region where an upper portion of an information-containing signal is overlapped with a replica signal of the information-containing signal. The lower overlapped region may be a lower region of an information-containing signal overlapped with a replica signal of the information-containing signal.

Figure 1:
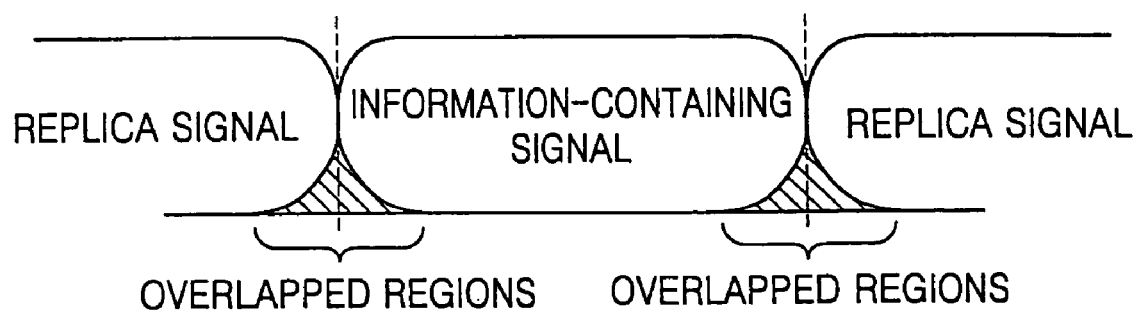
FIG. 1 illustrates a redundancy signal model used for synchronization after a Nyquist filtering process.

FIG. 1 illustrates a redundancy signal model used for synchronization after a Nyquist filtering process. Redundancy information existing in the overlapping regions may be generated as a result of the Nyquist filtering process of a transmitter. The Nyquist filtering process is designed to prevent unnecessary inter-symbol interference (ISI) and to reduce an occupied bandwidth.

The Nyquist filtering process may be characterized with a roll-off factor. As the roll-off factor becomes smaller, the bandwidth of a signal becomes narrower and redundancy information contained in the signal becomes smaller. As a result, synchronization of the received signal becomes more difficult and receiver performance may become more sensitive to synchronization errors. Conversely, as the roll-off factor becomes larger, the bandwidth of the signal becomes wider and redundancy information contained in the signal becomes larger. In addition, the associated synchronization process may have greater reliability.

In an actual ATSC transmission system, the roll-off factor may be determined as a trade-off between the occupied bandwidth and the difficulty of synchronization. An example ATSC transmission system may use a Nyquist filtering process having a roll-off factor R of 0.115.

Figure 2:
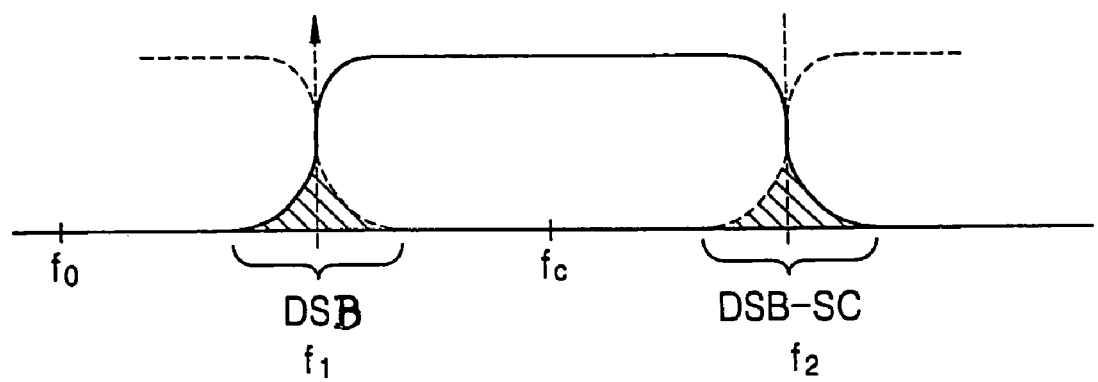
FIG. 2 illustrates a VSB signal model used for carrier phase recovery and symbol timing synchronization processes.

FIG. 2 illustrates a VSB signal model used for carrier phase recovery and symbol timing synchronization processes. In an ATSC system, a lower portion of a signal spectrum contains a pilot component. Therefore, the lower portion of the signal spectrum may be referred to as a double side band (DSB) signal having an unsuppressed carrier. An upper portion of the signal spectrum may be referred to as another DSB signal having a suppressed carrier (hereinafter, a "DSB-SC signal") without the pilot component. The DSB-SC signal is used for the synchronization process.

On the other hand, as shown in FIG. 1, an intermediate portion of the signal spectrum is the aforementioned information-containing region. In accordance with the example embodiments of the present invention, the intermediate portion of the signal spectrum is not used for the synchronization process, since the intermediate portion does not contain the redundancy information.

The carrier phase and symbol timing recovery circuits according to the example embodiments of the present invention may be designed so as to use all the redundancy information existing in the ATSC signal for both carrier phase and symbol timing synchronization processes. In an example, the redundancy information exists in the pilot signal, the upper overlapped region and the lower overlapped region.

It is known that the carrier phase synchronization process on the DSB-SC signal may be performed using a maximum a-posteriori (MAP) estimation loop. The MAP estimation loop is described in detail in an article written by M. K. Simon, titled "Optimal Receiver Structures for Phase-Multiplexed Modulations" (IEEE Trans. Commun., Vol. COM-26, No. 6, June 1978, pp. 865-872). The relevant portions of the Simon article as relating to the MAP estimation loop are incorporated in their entirety by reference herein.

In the receiver described in the Simon article, a phase error signal may be generated in accordance with Equation 1. Equation 1 describes an expression for phase error detection.

$$e_P(k) = \frac{2E_s}{N_0} I_k \tanh\left(\frac{2E_s}{N_0} Q_k\right) - \frac{2E_s}{N_0} Q_k \tanh\left(\frac{2E_s}{N_0} I_k\right) \quad \text{[Equation 1]}$$

In Equation 1, $I_k$ and $Q_k$ are real (in-phase) and imaginary (quadrature) outputs of a matching filter of the receiver, respectively; $E_s$ denotes signal power, and $N_0$ denotes the single side power spectrum density of an additive white Gaussian noise (AWGN). However, since signal-to-noise (SNR) information of the receiver needs to be previously known in order to obtain a desired and/or optimal MAP circuit, the MAP estimation loop described in the Simon article is not practicable.

In a case where the SNR is low, a potentially more useful (sub-optimal) approximation can be obtained. In the course of the approximation, the function tan h(x) in Equation 1 may be replaced with Equation 2.

$$\tanh(x) \approx x - \frac{x^3}{3} \quad \text{[Equation 2]}$$

In the course of the approximation, the phase error detection equation (Equation 1) may be replaced with an approximated phase error detection equation, as shown in Equation 3 below. As a result, a phase error detector using Equation 3 can be obtained.

$$e_P(k) = I_k Q_k (I_k^2 - Q_k^2) \quad \text{[Equation 3]}$$

As in the phase error signal described in the aforementioned Simon article, the phase error signal in accordance with Equation 3 may be a product of a conventional bi-phase Costas loop error signal $(I_k Q_k)$ and a lock detection signal $(I_k^2 - Q_k^2)$ associated with the aforementioned detector. A phase error detector using Equation 3 may be suitable for a non-binary alphabet process, for example, such as a quaternary phase shift keying (QPSK) modulation process, which is unlike a phase error detector using a conventional Costas loop.

Figure 3:
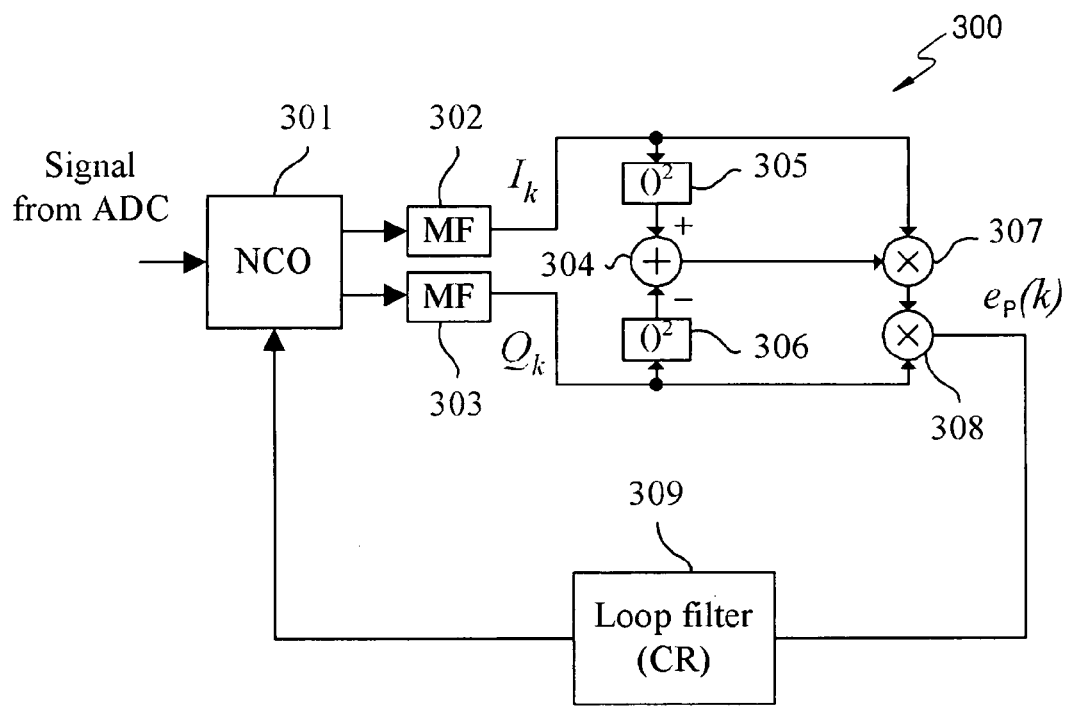
FIG. 3 is a block diagram illustrating a conventional DSB carrier phase tracking loop in a conventional error detector.

FIG. 3 is a block diagram illustrating a conventional DSB carrier phase tracking loop in a conventional error detector 300 using Equation 3. The error detector 300 using Equation 3 may include a numerically-controller oscillator (NCO) 301, two matching filters (MF) 302 and 303, an addition/subtraction unit 304, two squaring units 305 and 306, two multiplication units 307 and 308 and a loop filter 309.

A signal output from an analog-to-digital converter (ADC) (not shown) may be input to the NCO 301. The NCO 301 shifts the signal so that a central frequency $f_c$ of the signal coincides with a zero frequency. Since the shifted signal is a complex signal, real and imaginary signals output from the NCO 301 may be generated by multiplying the shifted signal with $\cos(2\pi f_c kT+\theta)$, and $\sin(2\pi f_c kT+\theta)$, respectively. Here, T may be a sampling interval, $\theta$ represents a phase of the NCO 301, and k=0, 1, 2, 3, . . . .

The real and imaginary signals output from the NCO 301 may be subject to filtering by matching filters 302 and 303. Each of the matching filters 302 and 303 performs filtering on the signal to obtain a square root raised cosine shape with a 3 dB bandwidth at $0.5(f_2-f_1)=0.5f_c$. The filtered real and imaginary signals $I_k$ and $Q_k$ may be subject to squaring in squaring units 305 and 306. The squared real and imaginary signals $I_k^2$ and $Q_k^2$ may be subtracted from each other in the addition/subtraction unit 304 to obtain a value of $(I_k^2-Q_k^2)$. The value of $(I_k^2-Q_k^2)$ may be multiplied consecutively with the filtered real and imaginary signals $I_k$ and $Q_k$ in multiplication units 307 and 308 so as to obtain a phase error signal $e_P(k)$, that is, $I_k Q_k (I_k^2-Q_k^2)$. As shown in FIG. 3, the phase error signal $e_P(k)$ may be input to the loop filter 309. An output from the loop filter 309 may be used to adjust a carrier phase offset in the NCO 301.

As can be seen from Equation 3, an error detector using Equation 3 contains quartic product terms. Therefore, it can be understood by those having ordinary skill in the art that squaring loss in the loop is involved with quartic product noise.

In an effort to reduce squaring loss and potentially improve tracking performance, in some applications the error detector using Equation 3 in FIG. 3 may be replaced with an alternative error detector using Equation 4.

$$e_P(k)=I_k Q_k \text{sign}(E[I_k^2-Q_k^2]) \neq I_k Q_k \text{sign}(E[|I_k|-|Q_k|]) \quad \text{[Equation 4]}$$

In equation 4, E[ ] denotes a mean process. The function sign(x) returns a sign value of a variable x. An error detector using Equation 4 has the same S-curves as those of the error detector using Equation 3. However, since a tracking mode of the error detector using Equation 4 does not contain quadratic noise terms, the error detector using Equation 4 may have smaller squaring loss, as compared to the conventional error detector using Equation 3.

Thus, an error detector using Equation 4 may be adapted to upper and lower overlapped regions of an ATSC signal as shown previously in FIGS. 1 and 2. In other words, when the signal is shifted so that the frequency $f_1$ of the signal coincides with the zero frequency, the error detector uses information existing in the lower overlapped region; and when the signal is shifted so that the frequency $f_2$ of the signal coincides with the zero frequency, the error detector uses information existing in the upper overlapped region.

In an ideal (or non-multipath) channel, two detectors adapted to the lower and upper overlapped regions may have the same S-curves and the same zero-crossing point in the S-curves. Therefore, in the ideal channel, outputs from the two detectors may be added to each other to provide higher noise-processing performance. The detectors adapted to the upper and lower overlapped regions may hereafter be referred to as an upper error detector and a lower error detector, for example.

Figure 4:
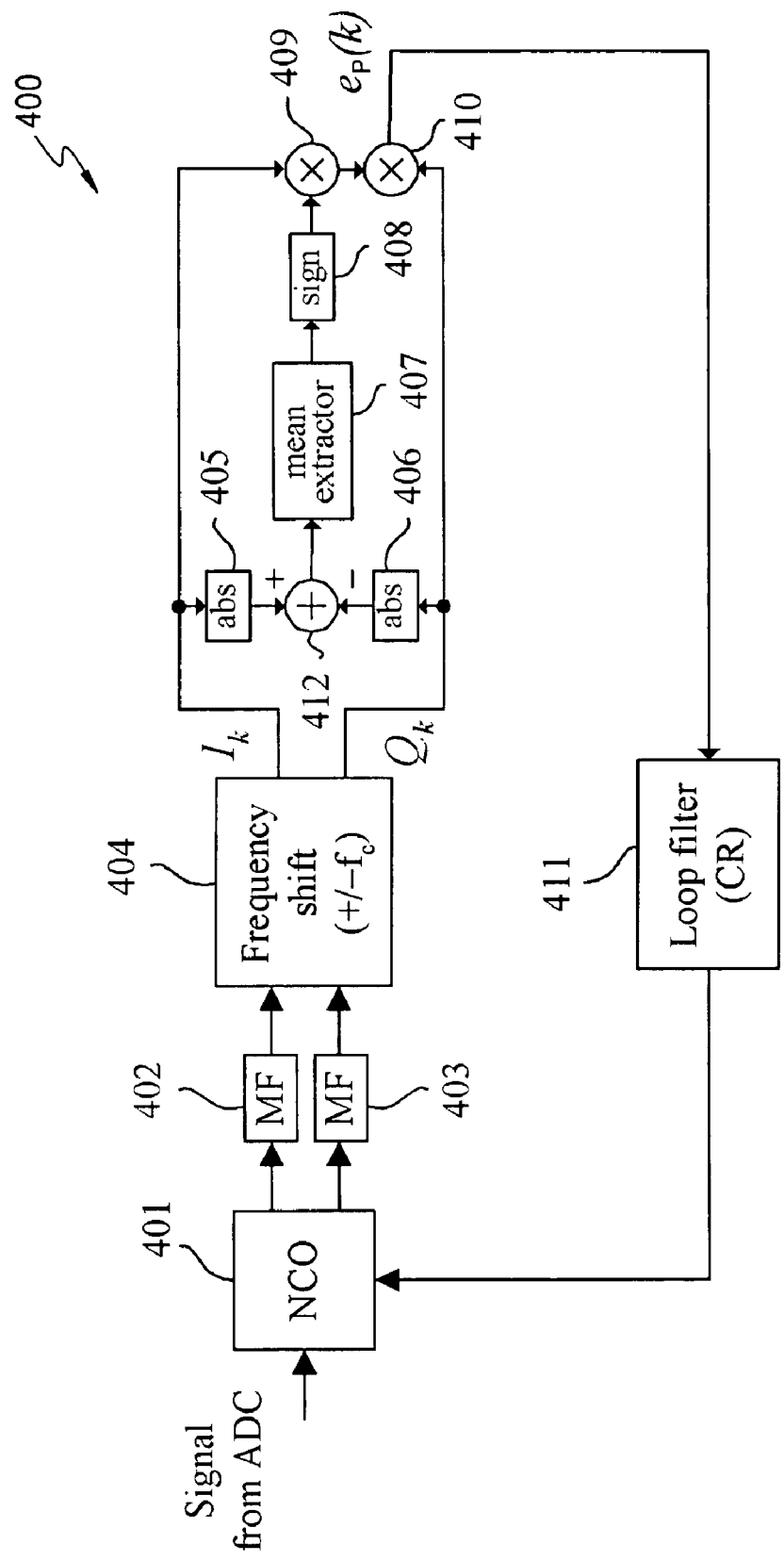
FIG. 4 is a block diagram illustrating an error detector using upper and lower overlapped regions in a signal model, according to an example embodiment of the present invention.

FIG. 4 is a block diagram illustrating an error detector using upper and lower overlapped regions in a signal model, according to an example embodiment of the present invention. An example error detector 400 using Equation 4 may include a NCO 401, a pair of matching filters 402 and 403, a frequency shifter 404, a pair of absolute value generation units 405 and 406, a mean value generation unit 407, a sign function unit 408, a pair of multiplication units 409 and 410, a loop filter 411, and an addition/subtraction unit 412.

As in FIG. 3, two signals output from the NCO 401 may be filtered in the matching filters 402 and 403. The two filtered signals may be input to frequency shifter 404. In the case of the lower error detector, the frequency shifter 404 shifts the signal so that the frequency $f_1$ shown in FIG. 2 coincides with the zero frequency of the signal. In the case of the upper error detector, the frequency shifter 404 shifts the signal so that the frequency $f_2$ shown in FIG. 2 coincides with the zero frequency of the signal.

Real and imaginary signals $I_k$ and $Q_k$ output from the frequency shifter 404 may then be input to the absolute value generation units 405 and 406 to obtain absolute values $|I_k|$ and $|Q_k|$ of the real and imaginary signals $I_k$ and $Q_k$. The absolute values $|I_k|$ and $|Q_k|$ may be subtracted from each other in the addition/subtraction unit 412 to obtain a value of $(|I_k|-|Q_k|)$. The value of $(|I_k|-|Q_k|)$ may be processed consecutively by the mean value generation unit 407 and sign function unit 408 to obtain the value of $\text{sign}(E[|I_k|-|Q_k|])$, as described in Equation 4.

The calculated value of $\text{sign}(E[I_k|-|Q_k|])$ may be multiplied consecutively by the real and imaginary signals $I_k$ and $Q_k$ in multiplication units 409 and 410 to obtain the phase error signal $e_P(k)$, that is, $I_k Q_k \text{sign}(E[|I_k|-|Q_k|])$. The phase error signal $e_P(k)$ may be input to the loop filter 411, with the output from loop filter 411 being used to adjust a carrier phase offset in the NCO 401.

If a pilot-based error detector has the same S-curve and positively-sloped zero-crossing point as those of the aforementioned lower and upper error detectors of FIG. 4, pilot information can be added to the aforementioned lower and upper error detectors. In this case, the pilot-based error detector has a construction similar to that shown in FIG. 4. But, before further processing is performed, all information except for the pilot information is removed. The pilot-based detector may operate in accordance with Equation 5 below.

$$e_P(k) = I'_k Q'_k \text{sign}(|I'_k|-|Q'_k|) \quad \text{[Equation 5]}$$

In equation 5, $I'_k$ and $Q'_k$ are mean values of in-phase and quadrature components of a shifted input signal. In other words, $I'_k$ and $Q'_k$ are constructed with only the pilot information. Since a mean process is performed at the time of generating the mean values $I'_k$ and $Q'_k$, a lock detector is not necessary to perform the mean process.

Figure 5:
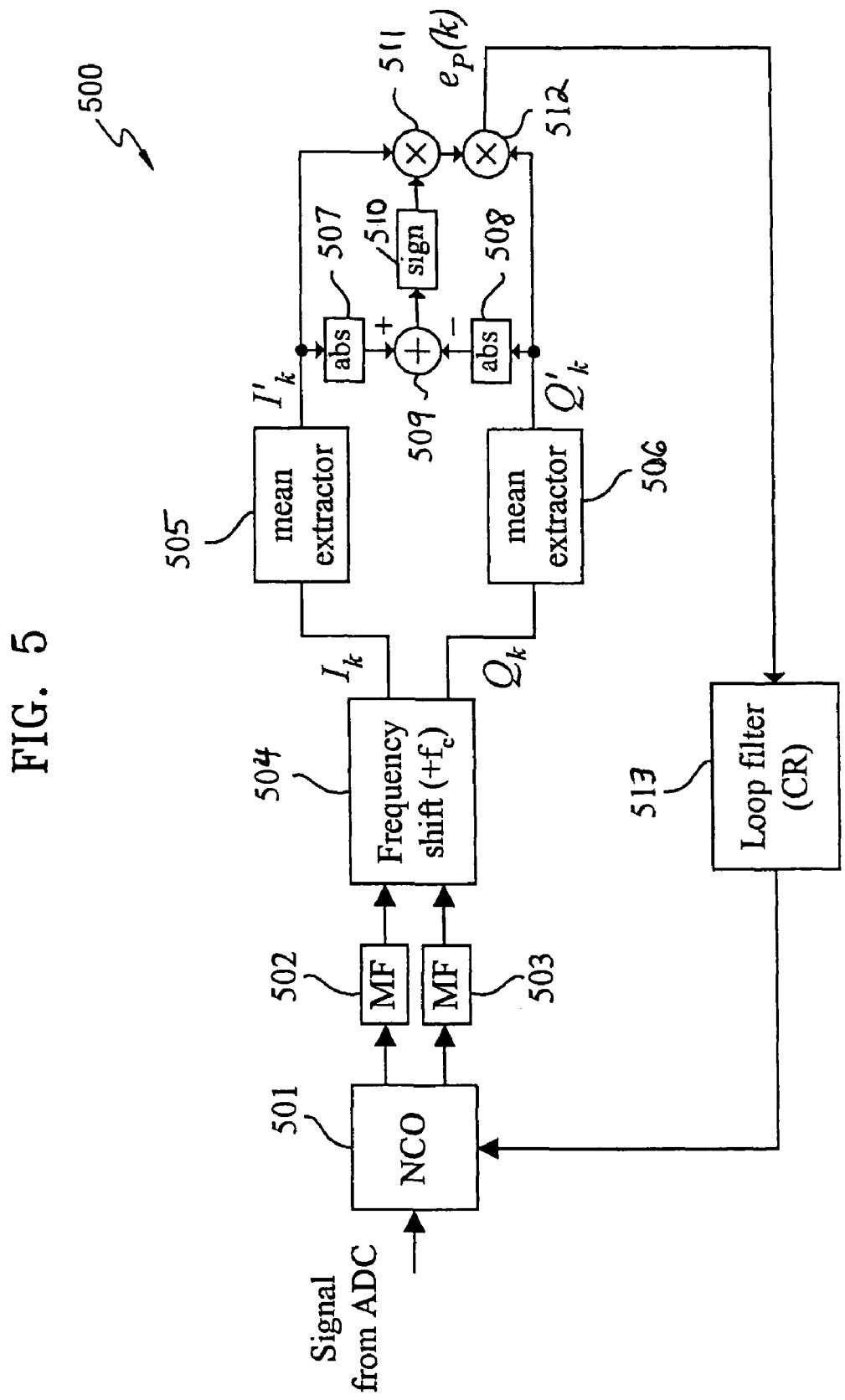
FIG. 5 is a block diagram illustrating a pilot-based error detector according to an example embodiment of the present invention.

FIG. 5 is a block diagram illustrating a pilot-based error detector according to an example embodiment of the present invention. The construction of the pilot-based error detector 500 is similar to that of the phase error detector shown in FIG. 4. For example, an error detector 500 may include a NCO 501, a pair of matching filters 502 and 503, a frequency shifter 504, a pair of mean value generation units 505 and 506, a pair of absolute value generation units 507 and 508, an addition/subtraction unit 509, a sign function unit 510, a pair of multiplication units 511 and 512, and a loop filter 513. The difference is that, in the pilot-based error detector 500 of FIG. 5, the mean values $I'_k$ and $Q'_k$ of the in-phase and quadrature components $I_k$ and $Q_k$ are obtained before the absolute values are obtained.

Figure 6:
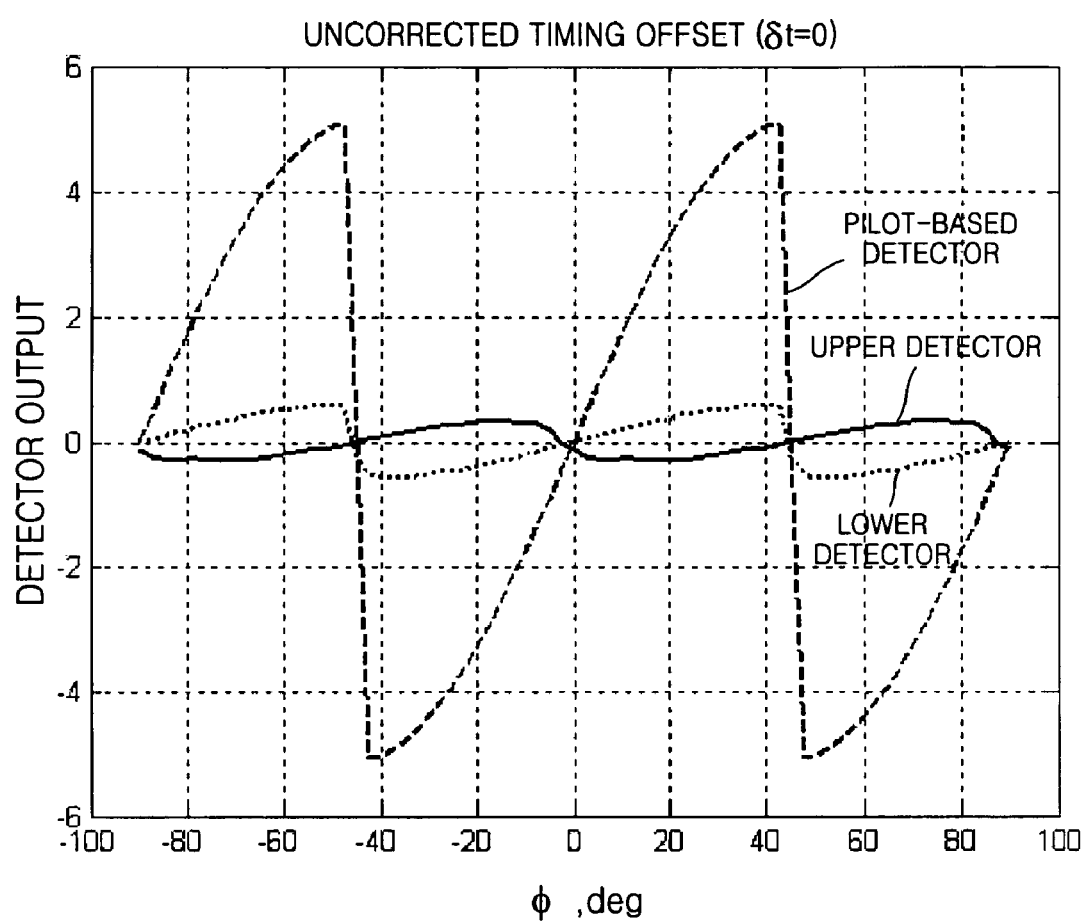
FIG. 6 is a graph for illustrating S-curves of a pilot-based error detector and upper and lower error detectors for a 2-ray multipath channel.

FIG. 6 is a graph for illustrating S-curves of a pilot-based error detector and upper and lower error detectors for a 2-ray multipath channel. Since the construction of the pilot-based error detector is similar to that of the upper and lower error detectors, outputs from three error detectors in the ideal (non-multipath) channel, that is, the pilot-based error detector and the upper and lower error detectors, can be added together. However, outputs from the phase error detectors in the multipath channel cannot simply be added to together. This is because the multipath channel may affect the upper and lower error detectors in varied ways. For example, when a signal is transmitted through a multipath channel and which may cause severe noise, the S-curves and positively-sloped zero-crossing points are not equal between the upper and lower error detectors. The results in the multipath channel in this example are shown in FIG. 6.

Referring to FIG. 6, in the 2-ray multipath channel environment, a ghost latency $\tau$ is 25.5 $T_s$ (where $T_s$ is a sampling interval) and a ghost phase $\Psi$ is 0°. In addition, at a converging point, symbol timing offset $\delta t=(0.5+2\,k)T_s$, and carrier phase offset $\phi=(22.5\pm 90\,k)°$, where $k=1, 2, 3, \ldots$. As shown in FIG. 6, the upper and lower error detectors have opposite S-curves. Therefore, addition of the signals output from the upper and lower error detectors results in deterioration of performance of the associated process.

Furthermore, the channel environment may be deteriorated more than as shown in FIG. 6. For example, the channel may introduce a deep null into a pilot frequency. In this case, an output from a joint error detector may provide a zero-gain error signal. The same result may be obtained even in a case where the upper and lower error detectors independently operate. However, there may be an optimal sampling time instant where the upper and lower detectors have the same S-curves and positively-sloped zero-crossing points.

Figure 7:
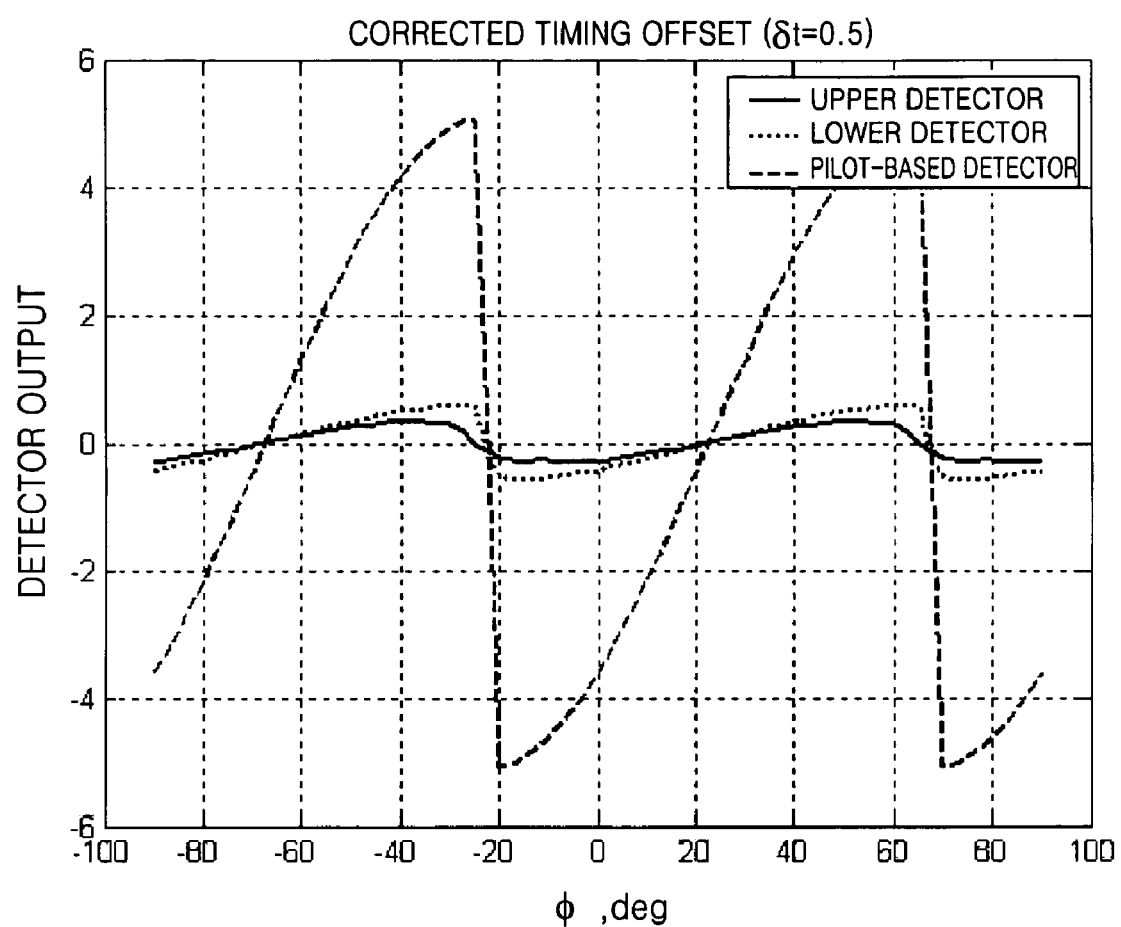
FIG. 7 is a graph for illustrating S-curves of the pilot-based error detector and the upper and lower error detectors at an optimal sampling time instant for the same channel as shown in FIG. 6.

FIG. 7 is a graph for illustrating S-curves of the pilot-based error detector and the upper and lower error detectors at an optimal sampling time instant for the same channel as shown in FIG. 6. Unlike the S-curves shown in FIG. 6 (the same channel; $\delta t=0$), the S-curves shown in FIG. 7 include an optimal sampling time instant ($\delta t=0.5$).

Although the outputs from the pilot-based error detector and the upper and lower error detectors can be added together at any sampling instant, the optimal sampling time instant should be tracked in order to simultaneously use the pilot-based and upper and lower error detectors. Unfortunately, the optimal sampling time instant cannot be tracked independently of a carrier phase recovery (CR) scheme, and a conventional symbol timing recovery (STR) scheme cannot be used. In other words, STR schemes based on a segment synchronization correlation and a Gardner algorithm cannot be used for tracking an optimal sampling time instant and carrier phase.

As a result, and in accordance with the example embodiments, a process for tracking an optimal sampling time instant and carrier phase may be performed by jointly using information from the pilot-based error detector and the upper and lower error detectors. Since the phase error detectors using Equations 4 and 5 depend on a sampling time offset as well as the carrier phase, the information from the pilot-based detector and the upper and lower detectors can be jointly used. Moreover, in conventional ATSC systems, effects resulting from dependency on the carrier phase recovery and symbol timing recovery have been treated as undesirable. According to the example embodiments of the present invention, this dependency may be used for optimal phase and timing error estimation.

An optimal sampling time instant $\tau_{opt}$ and an optimal carrier phase offset $\theta_{opt}$ can be tracked under the following conditions represented with Equations 6 through 8.

$$E[e_P(k)] = 0,\ E[e_L(k)] = 0,\ E[e_U(k)] = 0 \quad \text{[Equation 6]}$$

$$\text{sign}\left(\frac{\partial E[e_P(k)]}{\partial \theta}\right) = \text{sign}\left(\frac{\partial E[e_L(k)]}{\partial \theta}\right) = \text{sign}\left(\frac{\partial E[e_U(k)]}{\partial \theta}\right) \quad \text{[Equation 7]}$$

$$\text{sign}\left(\frac{\partial E[e_P(k)]}{\partial \tau}\right) = \text{sign}\left(\frac{\partial E[e_L(k)]}{\partial \tau}\right) = -\text{sign}\left(\frac{\partial E[e_U(k)]}{\partial \tau}\right) \quad \text{[Equation 8]}$$

At the position satisfying all the conditions represented in Equations 6 through 8, the optimal sampling time instant $\tau_{opt}$ and the optimal carrier phase offset $\theta_{opt}$ can be obtained.

In Equations 6-8, $e_P(k)$, $e_L(k)$, and $e_U(k)$ may denote phase error signals output from the pilot-based detector and the upper and lower detectors, respectively. In addition, θ denote a carrier phase and τ denotes a sampling time instant. It can be understood by those having ordinary sill in the art that $E[e_P(k)]$ is an S-curve.

The phase and timing error detectors satisfying Equations 6-8 are described in further detail below. A phase error detection signal PED(k) may be described in accordance with Equation 9, and a timing error detection signal TED(k) may be described in accordance with Equation 10.

$$PED(k) = e_P(k) + K_1 e_L(k) + K_2 e_U(k) \quad \text{[Equation 9]}$$

$$TED(k) = e_P(k) + K_1 e_L(k) - K_2 e_U(k) \quad \text{[Equation 10]}$$

In Equations 9 and 10, $K_1$ and $K_2$ are fixed coefficients, where $K_1 > 0$ and $K_2 > 0$. In a case where only the condition of Equation 6 is satisfied (and in only that case), it can be shown that both of the phase error detector and the timing error detector output zero. However, the condition of Equation 6 takes effect when two schemes, that is, carrier phase and symbol timing recovery schemes using Equations 9 and 10, respectively, work together.

On the other hand, in a conventional, separated carrier phase recovery scheme, even in a case where the condition of Equation 6 is not satisfied, the phase error detection signal PED(k) can be zero; $e_P(k) + K_1 e_L(k) = -K_2 e_U(k)$. However, in the joint symbol timing and carrier phase recovery circuit(s) and method according to the example embodiments of the present invention, the case where the condition of Equation 6 is not satisfied but only the condition of $e_P(k) + K_1 e_L(k) = -K_2 e_U(k)$ is satisfied is avoided. In other words, even in a case where the phase error detection signal PED(k) is zero, the timing error detector may output a non-zero timing error detection signal TED(k). Therefore, in the example joint symbol timing and carrier phase recovery circuit(s) and method, the phase and timing error detectors continue to operate in order to stably maintain an optimal sampling time instant τopt and optimal carrier phase offset $\theta_{opt}$.

Figure 8:
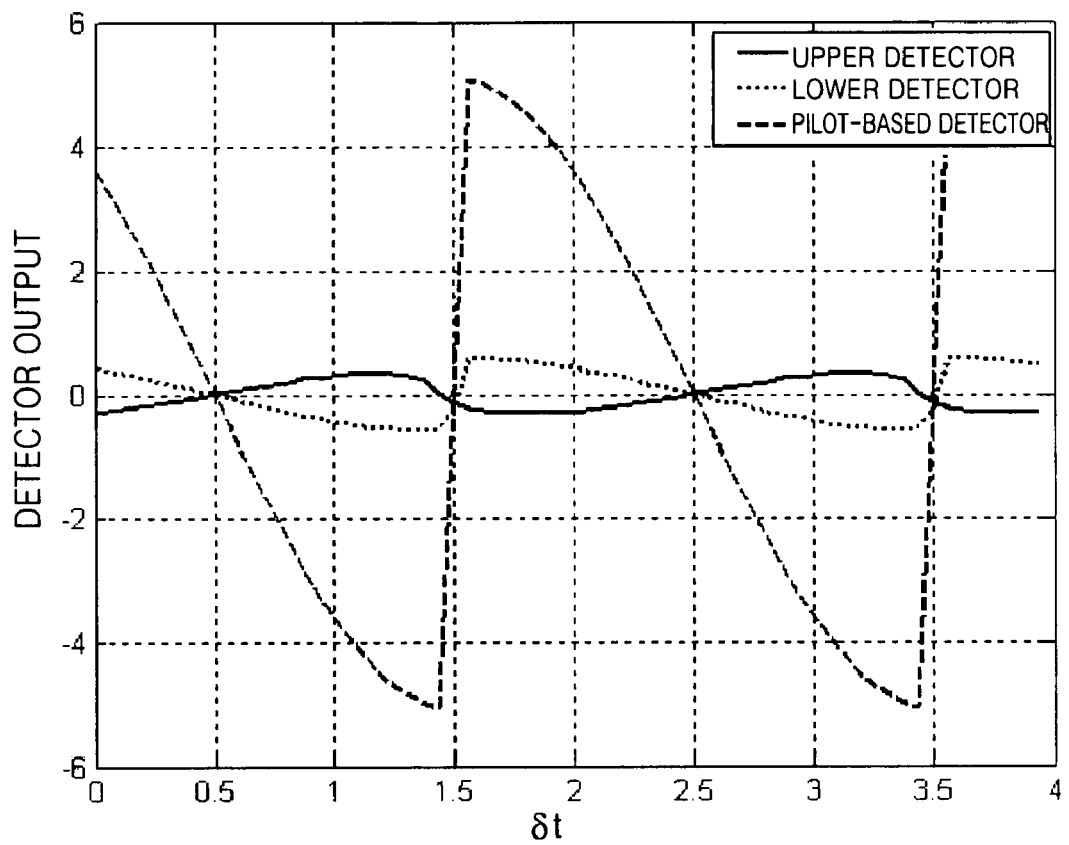
FIG. 8 is a graph for illustrating mean powers of the pilot-based error detector and the upper and lower error detectors with respect to time and a fixed corrected-phase offset for the same channel environments as shown in FIGS. 6 and 7.

FIG. 8 is a graph for illustrating mean powers of the pilot-based error detector and the upper and lower error detectors with respect to time and a fixed corrected-phase offset for the same channel environments as shown in FIGS. 6 and 7. It may be evident to those having ordinary skill in the art that the negative sign of the error signal $e_U(k)$ may be determined based on negative slope characteristics of $E[e_U(k)]$ with respect to time. FIG. 8 illustrates mean powers of the pilot based detector and the upper and lower detectors with respect to time with a fixed corrected-phase offset $\theta_{opt}$ (φ=22.5°). The channel environment of FIG. 8 is the same as that of FIGS. 6 and 7.

Returning to FIG. 7, in a case where a symbol timing offset δt is optimized (δt=0.5), if the carrier phase φ is 22.5° or −67.5°, the condition of Equation 6 is satisfied. As shown in FIG. 8, in a case where a carrier phase offset is optimized (φ=22.5°), if the symbol timing offset δt is 0.5 or 2.5, the condition of Equation 6 is satisfied. As a result, the sampling time instant $\tau_{opt}$ and the optimal carrier phase offset $\theta_{opt}$ may be obtained.

Figure 9A:
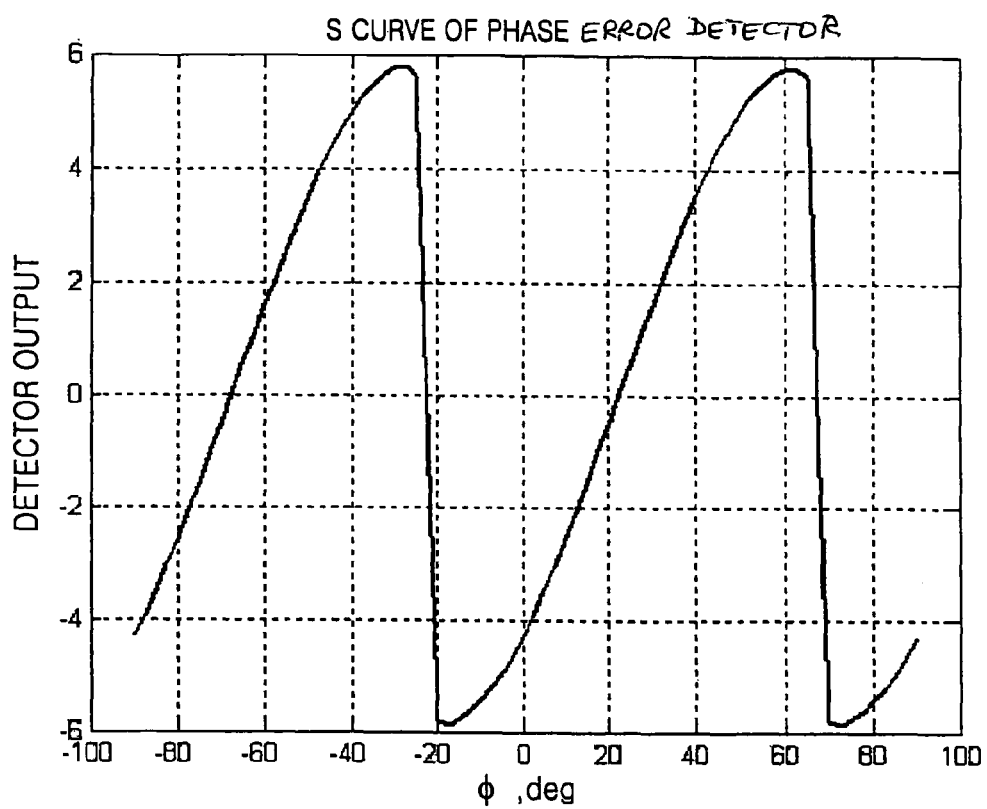
FIG. 9A is a graph for illustrating a synthetic S-curve of a phase error detector.
Figure 9B:
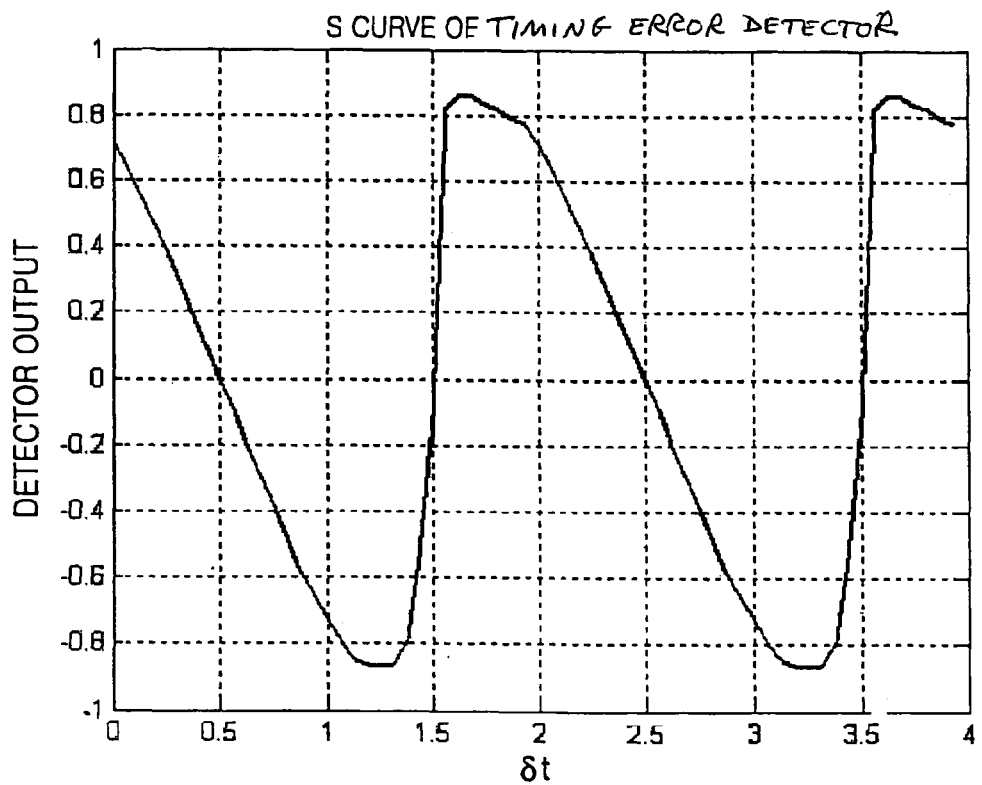
FIG. 9B is a graph for illustrating a synthetic S-curve of a timing error detector.

FIG. 9A is a graph for illustrating a synthetic S-curve of a phase error detector, and FIG. 9B is a graph for illustrating a synthetic S-curve of a timing error detector. In particular, FIGS. 9A and 9B show synthetic S-curves of the phase error detector E[PED(k)] and the timing error detector E[TED(k)] represented in Equations 9 and 10, respectively.

Referring to FIG. 9A, when the carrier phase offset is φ=22.5° or φ=−67.5°, the phase error detection signal PED(k) output from the phase error detector represented by Equation 9 is zero. In addition, referring to FIG. 9B, when the symbol timing offset δt is 0.5 or 2.5, the timing error detection signal TED(k) of the timing error detector represented by Equation 10 is zero.

Figure 10:
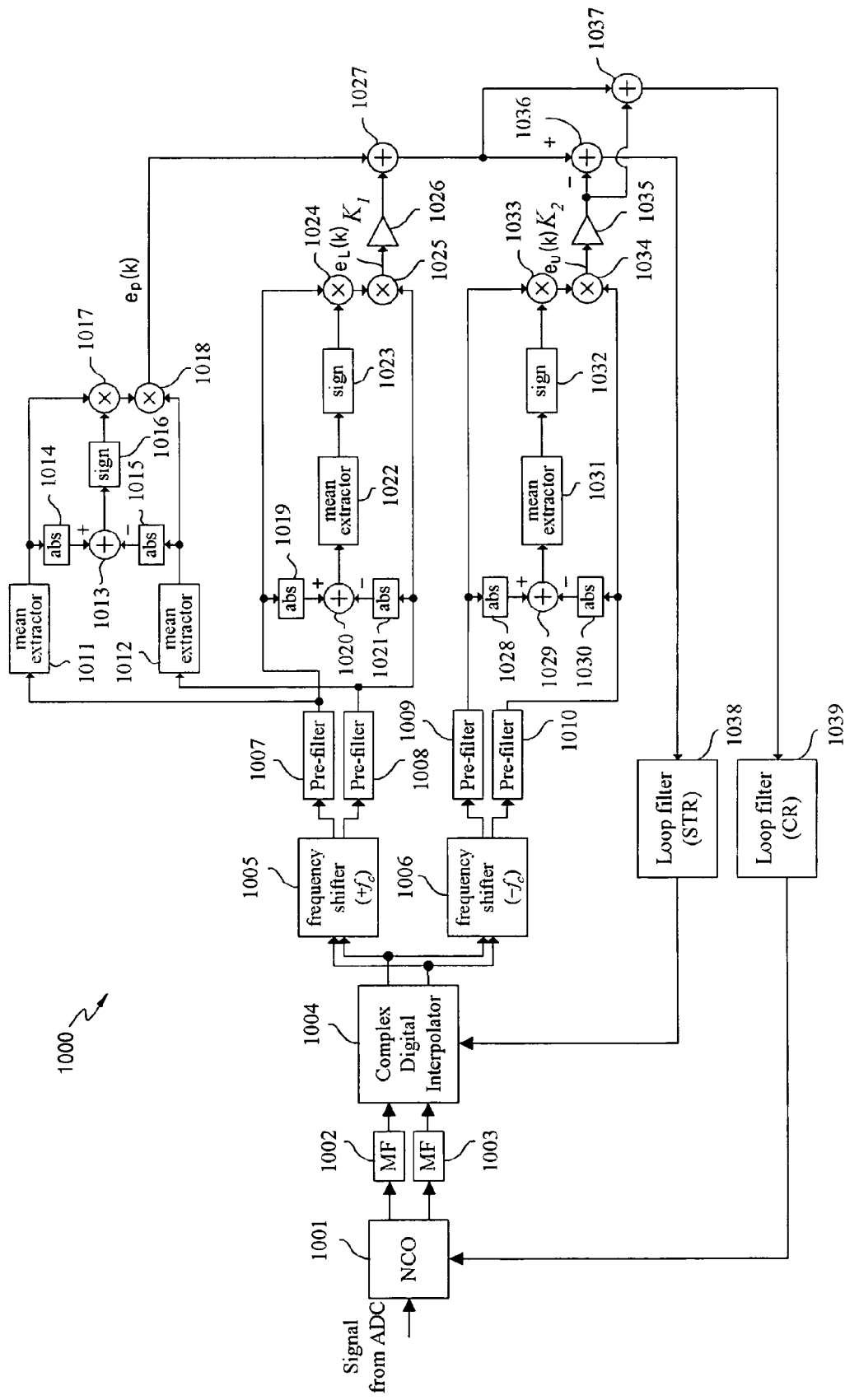
FIG. 10 is a block diagram illustrating a carrier phase and symbol timing recovery circuit, and for describing a method of recovering a carrier phase and a symbol timing in received digital signal data, according to an example embodiment of the present invention.

FIG. 10 is a block diagram illustrating a carrier phase and symbol timing recovery circuit, and for describing a method of recovering a carrier phase and a symbol timing in received digital signal data, according to an example embodiment of the present invention. The block diagram of FIG. 10 shows what occasionally may be referred to hereafter as a joint carrier phase and symbol timing recovery circuit 1000.

The joint carrier phase and symbol timing recovery circuit 1000 may include a NCO 1001, a first matching filter 1002, a second matching filter 1003, a complex digital interpolator 1004, a first frequency shifter 1005, a second frequency shifter 1006, first to fourth pre-filters 1007 to 1010, first to fourth mean value generation units 1011, 1012, 1022 and 1031, first to sixth absolute value generation units 1014, 1015, 1019, 1021, 1028 and 1030, first to sixth addition/subtraction units 1013, 1020, 1027, 1029, 1036 and 1037, first to third sign function units 1016, 1023 and 1032, first to sixth multiplication units 1017, 1018, 1024, 1025, 1033 and 1034, and first and second amplification units 1026 and 1035.

The second multiplication unit 1018 may output the pilot-based error signal $e_P(k)$ which uses the pilot signal. The fourth multiplication unit 1025 may output the lower-overlapped-region error signal $e_L(k)$ which uses the lower overlapped region. The sixth multiplication unit 1034 may output the upper-overlapped-region error signal $e_U(k)$ which uses the upper overlapped region.

The fifth addition/subtraction unit 1036 may output the timing error detection signal TED(k)=($e_P(k) + K_1 e_L(k) - K_2 e_U(k)$) represented by Equation 10. The sixth addition/subtraction unit 1037 may output the phase error detection signal PED(k)=($e_P(k) + K_1 e_L(k) + K_2 e_U(k)$) represented by Equation 9. The timing error detection signal TED(k) may be input to a loop filter 1038 for symbol timing recovery. The phase error detection signal PED(k) may be input to a loop filter 1039 for carrier phase recovery.

A digital signal output from an ADC (not shown) has the same signal spectrum as that of FIG. 2. The signal may be input to the NCO 1001. The NCO 1001 may shift the signal so that a central frequency $f_c$ of the signal coincides with a zero frequency. Since the shifted signal is a complex signal, real and imaginary signals output from the NCO 1001 may be generated by multiplying the shifted signal with $\cos(2\pi f_c kT + \theta)$ and $\sin(2\pi f_c kT + \theta)$, respectively. Here, T is a sampling interval, and θ is a phase of the NCO 1001, and k=0, 1, 2, 3, .... In a given example embodiment of the present invention, the sampling interval T may be set to half of the symbol interval in order to simplify hardware. However, it is evident to those having ordinary skill in the art that a shorter sampling interval T may be used.

The real and imaginary signals of the complex signal output from NCO 1001 may be filtered by first and second matching filters 1002 and 1003. Each of the first and second matching filters 1002 and 1003 may perform filtering on the signal to obtain a square root raised cosine shape with a 3 dB bandwidth at $0.5(f_2 - f_1) = 0.5 f_c$. The filtered real and imaginary signals may be re-sampled by the complex digital interpolator 1004. Since the NCO 1001, first and second matching filters 1002 and 1003 and complex digital interpolator 1004 are known elements in all digital receivers and/or well known to those having ordinary skill in the art, a detailed explanation of the construction and operation thereof are omitted herein for purposes of brevity.

The interpolated real and imaginary signals of the complex signal output from the complex digital interpolator 1004 may be input to the first and second frequency shifters 1005 and 1006. The output signal of the first frequency shifter 1005 has a zero frequency corresponding to a frequency $f_1$. The output signal of the second frequency shifter 1006 has a zero frequency corresponding to a frequency $f_2$. The output signal of the first frequency shifter 1005 may be used for the pilot-based error detector and the lower error detector. The output signal of the second frequency shifter 1006 may be used for the upper error detector.

The output signals of the first and second frequency shifters 1005 and 1006 may be input to the first through fourth pre-filters 1007-1010. Each of the first through fourth pre-filters 1007-1010 may include a function of filtering a portion of the signal spectrum which includes no redundancy information. Each of the first through fourth pre-filters 1007-1010 may be embodied as a low pass transversal filter, for example. The bandwidths of the first through fourth pre-filters 1007-1010 may depend on roll-off factors of the corresponding matching filters. For example, in an ATSC system, the bandwidths of the first through fourth pre-filters 1007-1010 may be about 300 khz.

Units 1011-1018 collectively may constitute the aforementioned pilot-based error detector. In general, the pilot-based error detector may be embodied as a relatively simple low pass filter having a substantially low cut-off frequency. The pilot-based error signal $e_P(k)$ may thus be generated by using units 1011-1018 in the same manner described with reference to FIG. 5.

For example, the first and second pre-filters 1007 and 1008 may output the real and imaginary output signals $I_k$ and $Q_k$, respectively. In response to the real and imaginary output signals $I_k$ and $Q_k$, the first and second mean value generation units 1011 and 1012 may generate mean values $I'_k$ and $Q'_k$ of in-phase and quadrature components of a shifted input signal. Here, the in-phase and quadrature mean values $I'_k$ and $Q'_k$ may be constructed only with the pilot information.

In response to in-phase and quadrature mean values $I'_k$ and $Q'_k$, the absolute value generation units 1014 and 1015 may generate absolute values $|I'_k|$ and $|Q'_k|$, respectively. The absolute values $|I'_k|$ and $|Q'_k|$ may be subtracted from each other in the addition/subtraction unit 1013 to obtain a value of $(|I'_k|-|Q'_k|)$. The value of $(|I'_k|-|Q'_k|)$ may be processed by the sign function unit 1016 to obtain a value of sign $(|I'_k|-|Q'_k|)$, as shown in Equation 5. The value of sign $(|I'_k|-|Q'_k|)$ may then be multiplied consecutively with the real and imaginary signals $I'_k$ and $Q'_k$ in multiplication units 1017 and 1018 to obtain the pilot-based error signal $e_P(k)$; that is, $I'_k Q'_k$ sign $(|I'_k|-|Q'_k|)$ as shown by Equation 5.

Meanwhile, units 1019-1025 collectively may constitute the aforementioned lower error detector. In addition, units 1028-1034 may collectively constitute the aforementioned upper error detector. The lower-overlapped-region error signal $e_L(k)$ and the upper-overlapped-region error signal $e_U(k)$ may be generated by in units 1019-1025 and units 1028-1034, respectively, in substantially the same manner as described with reference to FIG. 4.

The operations of the lower and upper error detectors are similar to each other. The only difference is that the lower and upper error detectors use the first and second frequency shifters 1005 and 1006 to allow the zero frequency of the signal to coincide with frequencies $f_1$ and $f_2$, respectively. Therefore, for purposes of brevity only the lower error detector will be described in detail hereafter.

Similar to the pilot-based error detector, in the lower error detector, the first and second pre-filters 1007 and 1008 may output the real and imaginary output signals $I_k$ and $Q_k$, respectively. In response to the real and imaginary signals $I_k$ and $Q_k$ output from the first and second pre-filters 1007 and 1008, the absolute value generation units 1019 and 1021 may generate respective absolute values $|I_k|$ and $|Q_k|$. The absolute values $|I_k|$ and $|Q_k|$ may be subtracted from each other in the addition/subtraction unit 1020 to obtain a value of $(|I_k|-|Q_k|)$. The value of $(|I_k|-|Q_k|)$ may be processed consecutively by the mean value generation unit 1022 and the sign function unit 1023 to obtain a value of sign $(E[|I_k|-|Q_k|])$, as shown by Equation 4. The value of sign $(E[|I_k|-|Q_k|])$ may then be multiplied consecutively with the real and imaginary signals $I_k$ and $Q_k$ in multiplication units 1024 and 1025 to obtain the lower-overlapped-region error signal $e_L(k)$; that is, $I_k Q_k$ sign $(E[|I_k|-|Q_k|])$, as represented by Equation 4. In the same manner, the upper-overlapped-region error signal $e_U(k)$ is output from the multiplication unit 1034.

The amplification units 1026 and 1035 may then multiply the lower-overlapped-region error signal $e_L(k)$ and the upper-overlapped-region error signal $e_U(k)$ with constants $K_1$ and $K_2$, respectively. Next, $e_P(k)+K_1 e_L(k)+K_2 e_U(k)$ may be generated by the fourth and sixth addition/subtraction units 1027 and 1037, and $e_P(k)+K_1 e_L(k)-K_2 e_U(k)$ may be generated by the fourth and fifth addition/subtraction units 1027 and 1036. In other words, the phase and timing error detection signals PED(k) and TED(k) represented by Equations 9 and 10 may be output from the corresponding addition/subtraction units 1037 and 1036.

As shown in FIG. 10, the output phase and timing error detection signals PED(k) and TED(k) may be inputs to the corresponding secondary loop filters 1039 and 1038, and output signals of the secondary loop filters 1039 and 1038 may be used to simultaneously adjust the carrier phase and symbol timing offsets in the NCO 1001 and the complex digital interpolator 1004.

Figure 11:
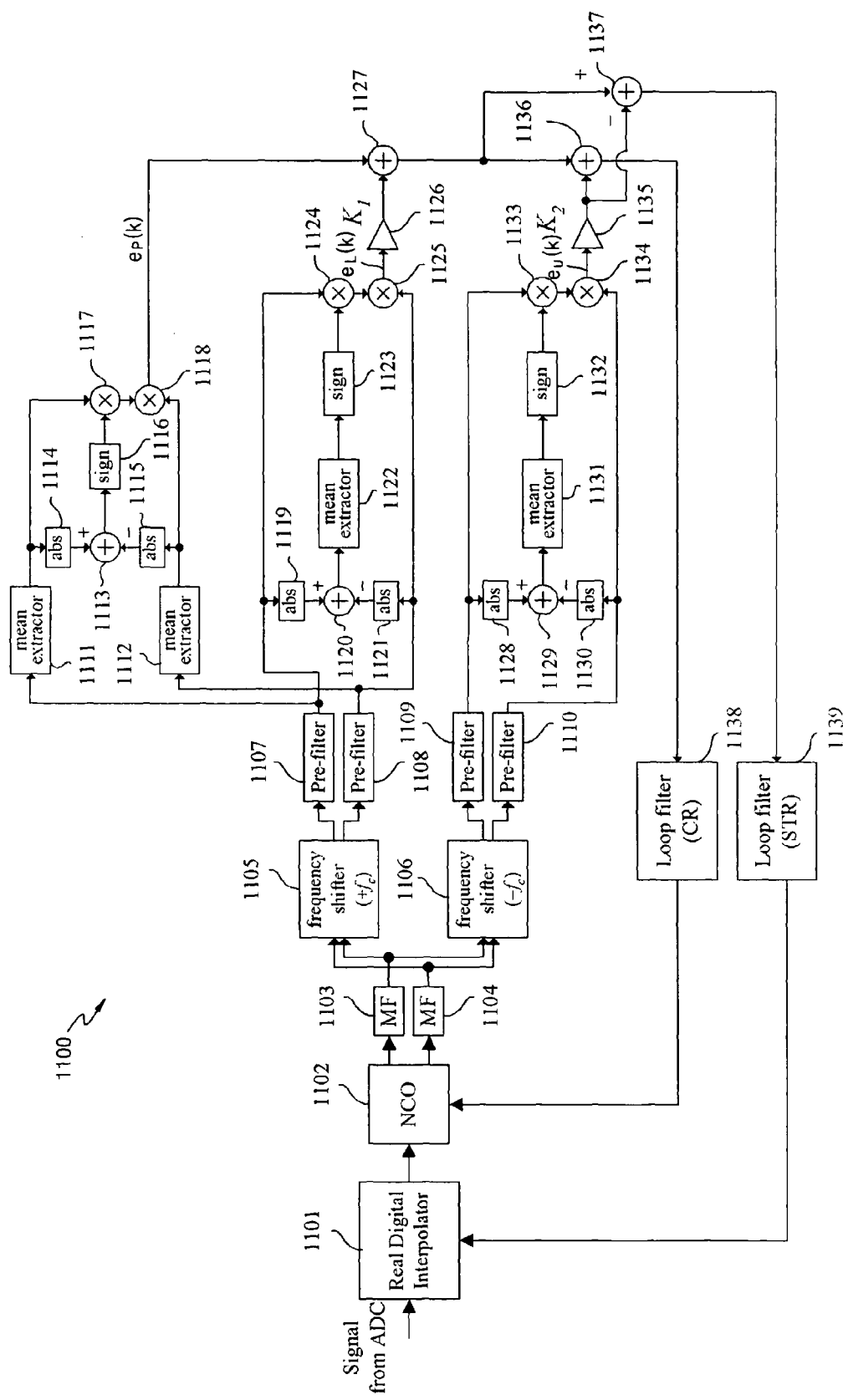
FIG. 11 is a block diagram illustrating a carrier phase and symbol timing recovery circuit according to another example embodiment of the present invention.

FIG. 11 is a block diagram illustrating a carrier phase and symbol timing recovery circuit according to another example embodiment of the present invention. FIG. 11 shows a modified example of joint carrier phase and symbol timing recovery circuit 1100 embodying the carrier phase and a symbol timing recovery methodology of FIG. 10 with a smaller amount of hardware.

Although the construction of the joint carrier phase and symbol timing recovery circuit (hereafter "recovery unit 1100" for brevity) of FIG. 11 is similar to that of FIG. 10, the positions of the interpolator 1101 and the NCO 1102 of FIG. 11 are opposite to those of FIG. 10. In addition, the interpolator 1101 of FIG. 11 is a real digital interpolator, while the interpolator 1004 of FIG. 10 is a complex digital interpolator. Since the size of the real digital interpolator 1101 is about half the size of the complex digital interpolator 1004, the recovery unit 1100 of FIG. 11 may be constructed with smaller hardware than that of FIG. 10.

The carrier phase and a symbol timing recovery methodology implemented by the recovery unit 1100 may have relatively lower processing performance than recovery unit 1000 of FIG. 10. According to the recovery methodology of FIG. 11, it takes longer to obtain a stable point, that is, the aforementioned optimal sampling time instant $\tau_{opt}$ and the optimal carrier phase offset $\theta_{opt}$. This may be because the real digital interpolator 1101 generally causes an additional phase shift every time the symbol timing position changes.

Figure 12:
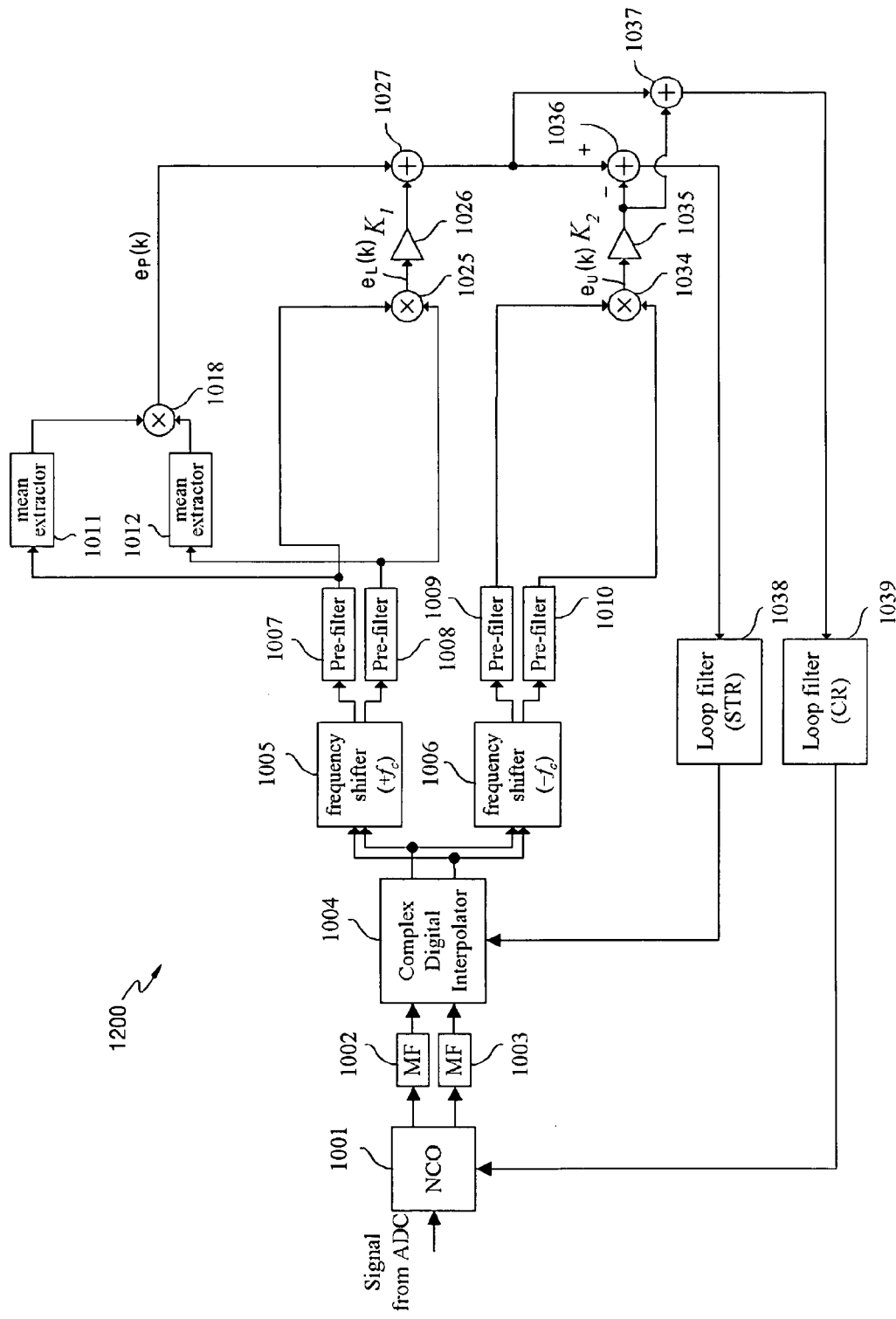
FIG. 12 is a block diagram illustrating a carrier phase and symbol timing recovery circuit according to another example embodiment of the present invention.

FIG. 12 is a block diagram illustrating a carrier phase and symbol timing recovery circuit according to another example embodiment of the present invention. FIG. 12 shows another example recovery circuit embodying the recovery methodology of FIG. 10. In the joint symbol timing and carrier phase recovery circuit 1200 of FIG. 12, units 1013-1017, units 1019-1024, and units 1028-1033 of the joint symbol timing and carrier phase recovery circuit 1000 of FIG. 10 have been removed. As a result, the pilot-based error signal $e_P(k)$ results in $e_P(k)=I'_k Q'_k$. In addition, the lower-overlapped-region error signal $e_L(k)$ and the upper-overlapped-region error signal $e_U(k)$ result in $e_L(k)=I_k Q_k$ and $e_U(k)=I_k Q_k$.

Figure 13:
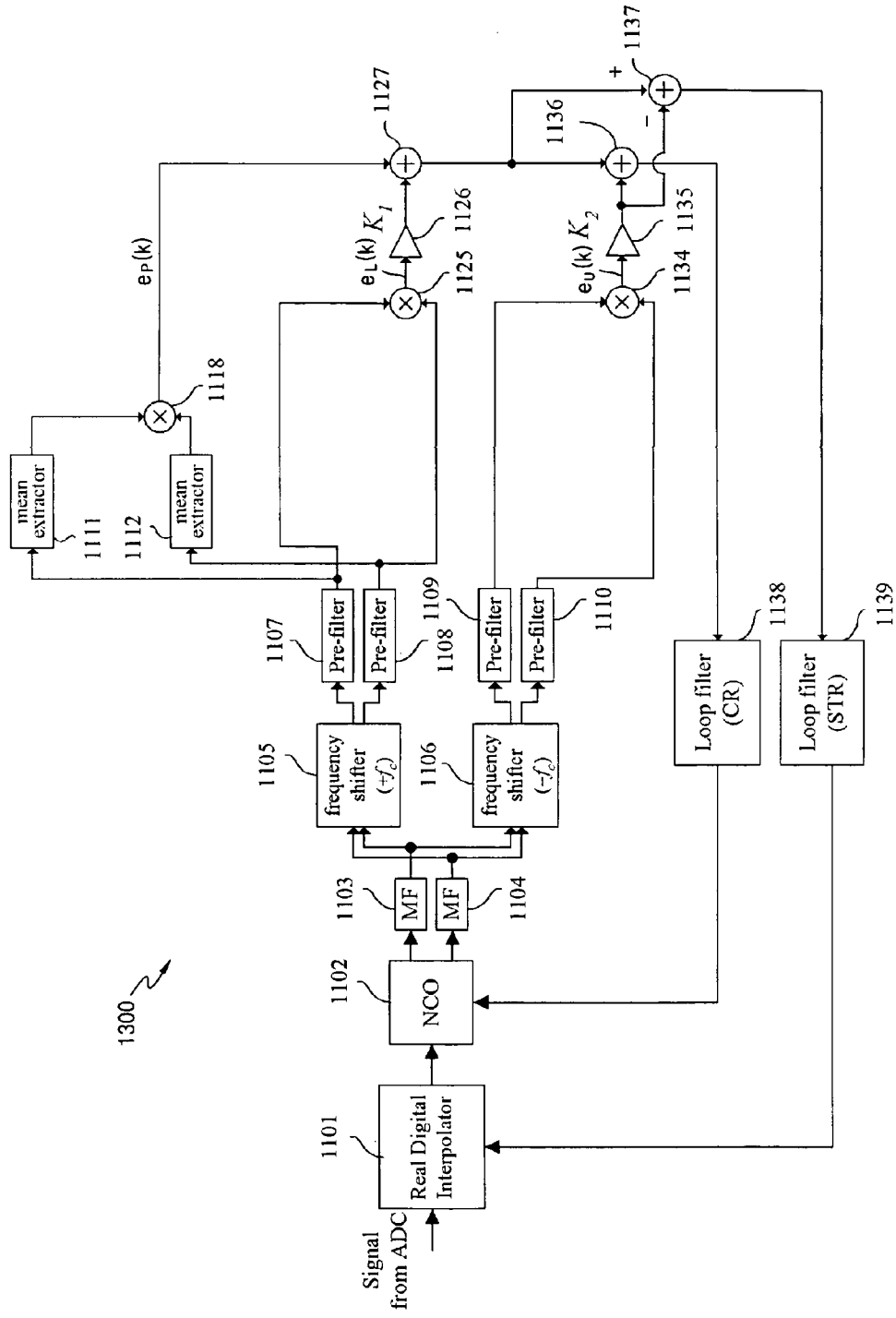
FIG. 13 is a block diagram illustrating a carrier phase and symbol timing recovery circuit according to another example embodiment of the present invention.

FIG. 13 is a block diagram illustrating a carrier phase and symbol timing recovery circuit according to another example embodiment of the present invention. FIG. 13 shows another example recovery circuit 1300 embodying the recovery methodology of FIG. 12 with a smaller amount of hardware. Although the construction of the recovery unit 1300 of FIG. 13 is similar to that of FIG. 12, the positions of the interpolator 1101 and the NCO 1102 of FIG. 13 are opposite to those of FIG. 12.

Additionally, the interpolator 1101 of FIG. 13 is a real digital interpolator, while the interpolator 1004 of FIG. 10 is a complex digital interpolator. Since the size of the real digital interpolator 1101 is half the size of the complex digital interpolator 1004, the recovery unit 1300 of FIG. 13 can be constructed with smaller hardware than that of FIG. 10 or FIG. 12. However, the recovery methodology of FIG. 13 may have a relatively lower processing performance than that of FIG. 10 or FIG. 12, since it takes longer to obtain $\tau_{opt}$ and $\theta_{opt}$, due to additional phase shift every time the symbol timing position changes, which is caused by use of real digital interpolator 1101.

Similarly to the construction of FIG. 12, in the joint symbol timing and carrier phase recovery circuit 1300 of FIG. 12, units 1013-1017, units 1019-1024, and units 1028-1033 in the recovery circuit 1000 of FIG. 10 are removed. As in FIG. 12, the pilot-based error signal $e_P(k)$ results in $e_P(k)=I'_k Q'_k$, and $e_L(k)$ and $e_U(k)$ result in $e_L(k)=I_k Q_k$ and $e_U(k)=I_k Q_k$, respectively, as described above.

The recovery circuits according to the examples in FIGS. 11 and 13 may thus be constructed with smaller hardware than those of FIGS. 10 and 12. However, since the sign function terms are removed from Equations 4 and 5, a relatively larger amount of error may be generated, so that it may take a bit longer to complete a recovery process.

Therefore, the example embodiments provide a carrier phase and symbol timing recovery circuit for an ATSC receiver, and method for recovering a carrier phase and a symbol timing in received digital signal data. The example circuits and method may be capable of performing a carrier phase and symbol timing recovery process jointly (i.e., simultaneously) without having to avoid correlation between carrier phase and symbol timing recovery circuits. The example circuits and methodology may use all the redundancy information existing in an ATSC signal for both carrier phase and symbol timing synchronizations, so as to simultaneously perform carrier phase and symbol timing recovery processes in the ATSC receiver.

While the example embodiments of the present invention have been particularly shown and described, it will be understood by those skilled in the art that various changes in form and details may be made therein without departing from the spirit and scope of the example embodiments of the present invention as defined by the following claims.

What is claimed:

1. A carrier phase and symbol timing recovery circuit for recovering a carrier phase and a symbol timing in received digital signal data, the circuit comprising:
   a pilot-based error detector detecting a first phase error based on a pilot signal included in the received digital signal data;
   a lower error detector detecting a second phase error based on data in a lower overlapped region, where a lower portion of an information-containing signal included in the received digital signal data overlaps a replica of the information-containing signal;
   an upper detector detecting a third phase error based on data in an upper overlapped region, where an upper portion of the information-containing signal overlaps a replica of the information-containing signal;
   a first calculation unit determining a carrier phase offset value from the detected first, second, and third phase errors; and
   a second calculation unit determining a symbol timing offset value from the detected first, second, and third phase errors;
   wherein a desired sampling time instant and carrier phase offset are detected at a point where an output of the first calculation unit and an output of the second calculation unit are both zero, so as to simultaneously recover the carrier phase and the symbol timing in the received digital signal data,
   wherein the first and second calculation units detect a point where mean values of the first, second, and third phase errors are simultaneously zero by using feedback,
   wherein the first calculation unit multiplies at least one of the first, second, and third phase errors with a respective constant before adding the first, second, and third phase errors, and
   wherein the second calculation unit multiplies at least one of the first, second, and third phase errors with the respective constant before adding the first phase error to the second phase error to obtain an addition result and subtracting the third phase error from the addition result.

2. The circuit of claim 1, wherein the first calculation unit multiplies the second phase error with a first constant and multiplies the third phase error with a second constant before adding the first, second, and third phase errors, and
   wherein the second calculation unit multiplies the second phase error with the first constant and multiplies the third phase error with the second constant before adding the first phase error to the second phase error to obtain the addition result and subtracting the third phase error from the addition result.

3. The circuit of claim 1, wherein the first and second calculation units simultaneously satisfy the equations $$\text{sign}\left(\frac{\partial E[e_P(k)]}{\partial \theta}\right) = \text{sign}\left(\frac{\partial E[e_L(k)]}{\partial \theta}\right) = \text{sign}\left(\frac{\partial E[e_U(k)]}{\partial \theta}\right);$$

and $$\text{sign}\left(\frac{\partial E[e_P(k)]}{\partial \tau}\right) = \text{sign}\left(\frac{\partial E[e_L(k)]}{\partial \tau}\right) = -\text{sign}\left(\frac{\partial E[e_U(k)]}{\partial \tau}\right)$$

to detect the desired sampling time instant and carrier phase offset at the point where the determined carrier phase offset and symbol timing offset values are both zero, and
   wherein E[ ] denotes a mean process; $e_P(k)$, $e_L(k)$, and $e_U(k)$ denote corresponding first, second, and third phase error signals, $\theta$ represents the carrier phase, and $r$ represents the sampling time instant.

4. The circuit of claim 3, wherein the first phase error is represented by $e_P(k)=I'_k Q'_k \text{sign}(|I'_k|-|Q'_k|)$, $I'_k$ and $Q'_k$ denoting mean values of real and imaginary components of an input signal shifted so that a central frequency of a signal overlapped with the lower portion of the information-containing signal coincides with a zero frequency, wherein the second phase error is represented by $e_L(k)=I_kQ_k\text{sign}(E[|I_k|-|Q_k|])$, $I_k$ and $Q_k$ denoting the real and imaginary components of the input signal shifted so that the central frequency of the signal overlapped with the lower portion of the information-containing signal coincides with the zero frequency, and wherein the third phase error is represented by $e_U(k)=I_kQ_k\text{sign}(E[|I_k|-|Q_k|])$, $I_k$ and $Q_k$ denoting real and imaginary components of the input signal shifted so that a central frequency of a signal overlapped with the upper portion of the information-containing signal coincides with the zero frequency.

5. The circuit of claim 4, further comprising:

a numerically controlled oscillator (NCO) shifting a received digital signal so that a central frequency of the received digital signal coincides with the zero frequency;

a pair of matching filters filtering the real and imaginary components of the shifted signal to obtain a square root raised cosine shape;

a complex digital interpolator re-sampling the filtered real and imaginary components of the shifted signal to output interpolated real and imaginary components;

a first frequency shifter shifting the interpolated real and imaginary components to output a first output signal having a zero frequency corresponding to a first frequency, wherein the first output signal is used for determining the first and second phase errors;

a second frequency shifter shifting the interpolated real and imaginary components to output a second output signal having a zero frequency corresponding to a second frequency, wherein the second output signal is used for determining the third phase error;

a first pair of pre-filters extracting only redundancy information from the first output signal, the pilot-based error detector detecting the first phase error and the lower error detector detecting the second phase error using real and imaginary components of the first output signal;

a second pair of pre-filters extracting only redundancy information from the second output signal, the upper error detector detecting the third phase error using real and imaginary components of the second output signal;

a first addition/subtraction unit adding the first and second phase errors detected by the pilot-based and lower error detectors to generate the addition result;

a second addition/subtraction unit subtracting the third phase error detected by the upper error detector from the addition result to generate the symbol timing offset;

a third addition/subtraction unit adding the third phase error to the addition result to generate the carrier phase offset;

a symbol timing recovery loop filter receiving the symbol timing offset and outputting a signal for adjusting the symbol timing to the complex digital interpolator; and a carrier phase recovery loop filter receiving the carrier phase offset and outputting a signal for adjusting the carrier phase to the NCO;

wherein the symbol timing recovery loop filter and carrier phase recovery loop filter simultaneously adjust the symbol timing and carrier phase for the received digital signal data.

6. The circuit of claim 5, wherein the redundancy information is associated with the pilot signal, the information-containing signal in the lower overlapped region, and the information-containing signal in the upper overlapped region.

7. The circuit of claim 5, wherein pilot-based error detector includes:

a first mean value generation unit calculating a mean value of the real component of the first output signal from a first pre-filter of the first pair of pre-filters;

a second mean value generation unit calculating a mean value of the imaginary component of the first output signal from a second pre-filter of the first pair of pre-filters;

a first absolute value calculation unit calculating an absolute value of the calculated mean value of the real component;

a second absolute value calculation unit calculating an absolute value of the calculated mean value of the imaginary component;

a fourth addition/subtraction unit subtracting the calculated absolute value of the second absolute value calculation unit from the calculated absolute value of the first absolute value calculation unit to generate a first subtraction result;

a first sign function unit performing a sign function on the first subtraction result to generate a first sign function output; and a first multiplication unit multiplying the generated first sign function output with the mean values of the real and imaginary components output from the first and second mean value generation units.

8. The circuit of claim 7, wherein the lower error detector includes:

a third absolute value calculation unit calculating an absolute value of the real component of the first output signal from a first pre-filter of the first pair of pre-filters;

a fourth absolute value calculation unit calculating an absolute value of the imaginary component of the first output signal from a second pre-filter of the first pair of pre-filters;

a fifth addition/subtraction unit subtracting the calculated absolute value of the fourth absolute value calculation unit from the calculated absolute value of the third absolute value calculation unit to generate a second subtraction result;

a third mean value generation unit calculating a mean value of the second subtraction result;

a second sign function unit performing a sign function on the calculated mean value of the second subtraction result to generate a second sign function output; and a second multiplication unit multiplying the generated second sign function output with the redundancy information extracted by the first pair of pre-filters from the first output signal.

9. The circuit of claim 8, wherein the upper error detector includes:

a fifth absolute value calculation unit calculating an absolute value of the real component of the second output signal from a first pre-filter of the second pair of pre-filters;

a sixth absolute value calculation unit calculating an absolute value of the imaginary component of the second output signal from a second pre-filter of the second pair of pre-filters;

a sixth addition/subtraction unit subtracting the calculated absolute value of the sixth absolute value calculation unit from the calculated absolute value of the fifth absolute value calculation unit to generate a third subtraction result;

a fourth mean value generation unit calculating a mean value of the third subtraction result;

a third sign function unit performing a sign function on the calculated mean value of the third subtraction result to generate a third sign function output; and a third multiplication unit multiplying the generated third sign function output with the redundancy information extracted by the second pair of pre-filters from the second output signal.

10. The circuit of claim 9, wherein the lower error detector further includes a first amplification unit multiplying an output of the second multiplication unit by a first constant, and wherein the upper error detector further includes a second amplification unit multiplying an output of the third multiplication unit by a second constant.

11. An Advanced Television System Committee (ATSC) receiver including the carrier phase and symbol timing recovery circuit of claim 1.

12. A method of recovering a carrier phase and a symbol timing in received digital signal data, the method comprising:

detecting, in a plurality of detectors, first, second, and third phase errors based on one or more of a pilot signal and an information-containing signal included in the received digital signal data;

determining, in a first calculator, a carrier phase offset value as a function of the detected first, second, and third phase errors; and determining, in a second calculator, a symbol timing offset value as a function of the detected first, second, and third phase errors;

wherein a desired sampling time instant and carrier phase offset are detected at a point where the determined carrier phase offset and symbol timing offset values are both zero, so as to simultaneously recover the carrier phase and the symbol timing in the received digital signal data, wherein determining the carrier phase and symbol timing offset values includes detecting a point where mean values of the first, second, and third phase errors are simultaneously zero by using feedback, wherein the first calculator multiplies at least one of the first, second, and third phase errors with a respective constant before adding the first, second, and third phase errors, and wherein the second calculator multiplies at least one of the first, second, and third phase errors with the respective constant before adding the first phase error to the second phase error to obtain an addition result and subtracting the third phase error from the addition result.

13. The method of claim 12, wherein detecting the first phase error is based on the pilot signal.

14. The method of claim 12, wherein detecting the second phase error is based on data in a lower overlapped region, where a lower portion of the information-containing signal overlaps a replica of the information-containing signal.

15. The method of claim 12, wherein detecting the third phase error is based on data in an upper overlapped region, where an upper portion of the information-containing signal overlaps a replica of the information-containing signal.

16. The method of claim 12, wherein determining the carrier phase offset value includes adding the detected first, second, and third phase errors.

17. The method of claim 16, wherein determining the carrier phase offset value further includes:

multiplying the second phase error by a first constant to obtain a multiplied second phase error;

multiplying the third phase error by a second constant to obtain a multiplied third phase error; and adding the first phase error, multiplied second phase error, and multiplied third phase error to determine the carrier phase offset value.

18. The method of claim 12, wherein determining the symbol timing offset value further includes:

multiplying the second phase error by a first constant to obtain a multiplied second phase error;

multiplying the third phase error by a second constant to obtain a multiplied third phase error;

adding the first phase error and the multiplied second phase error to obtain the addition result; and subtracting the multiplied third phase error from the addition result to determine the symbol timing offset value.

19. A carrier phase and symbol timing recovery circuit for recovering a carrier phase and a symbol timing in received digital signal data in accordance with the method of claim 12.

20. An ATSC receiver including a carrier phase and symbol timing recovery circuit for recovering a carrier phase and a symbol timing in received digital signal data in accordance with the method of claim 12.

21. A circuit for recovering a carrier phase and a symbol timing in received digital signal data, the circuit comprising:

a first error detector detecting a first phase error;

a second error detector detecting a second phase error;

a third error detector detecting a third phase error;

a first addition/subtraction unit determining a carrier phase offset value as a function of the detected first, second, and third phase errors; and a second addition/subtraction unit determining a symbol timing offset value as a function of the detected first, second, and third phase errors;

wherein a desired sampling time instant and carrier phase offset are detected at a point where an output of the first addition/subtraction unit and an output of the second addition/subtraction unit are both zero, so as to simultaneously recover the carrier phase and the symbol timing in the received digital signal data, wherein the first and second addition/subtraction units detect a point where mean values of the first, second, and third phase errors are simultaneously zero by using feedback, wherein the first addition/subtraction unit multiplies at least one of the first, second, and third phase errors with a respective constant before adding the first, second, and third phase errors, and wherein the second addition/subtraction unit multiplies at least one of the first, second, and third phase errors with the respective constant before adding the first phase error to the second phase error to obtain an addition result and subtracting the third phase error from the addition result.

22. The circuit of claim 21, wherein the first error detector detects the first phase error based on the pilot signal included in the received digital signal data.

23. The circuit of claim 21, wherein the received digital signal data includes an information-containing signal, and wherein the second error detector detects the second phase error based on data in a lower overlapped region, where a lower portion of the information-containing signal overlaps a replica of the information-containing signal.

24. The circuit of claim 21, wherein the received digital signal data includes an information-containing signal, and wherein the third error detector detects the third phase error based on data in an upper overlapped region, where an upper portion of the information-containing signal overlaps a replica of the information-containing signal.

25. The circuit of claim 21, wherein the first addition/subtraction unit determines the carrier phase offset value by multiplying the second phase error by a first constant to obtain a multiplied second phase error, multiplying the third phase error by a second constant to obtain a multiplied third phase error, and adding the first phase error, multiplied second phase error, and multiplied third phase error.

26. The circuit of claim 21, wherein the second addition/subtraction unit determines the symbol timing offset value by multiplying the second phase error by a first constant to obtain a multiplied second phase error, multiplying the third phase error by a second constant to obtain a multiplied third phase error, adding the first phase error and the multiplied second phase error to obtain the addition result, and subtracting the multiplied third phase error from the addition result.

27. The circuit of claim 21, further comprising:
a numerically controlled oscillator (NCO) shifting a signal from the received digital signal data so that a central frequency of the shifted signal coincides with a zero frequency;
a pair of matching filters filtering real and imaginary components of the shifted signal to obtain a square root raised cosine shape;
a complex digital interpolator re-sampling the filtered real and imaginary components of the shifted signal to output interpolated real and imaginary components;
a first frequency shifter shifting the interpolated real and imaginary components to output a first output signal having a zero frequency corresponding to a first frequency, wherein the first output signal is used for determining the first and second phase errors;
a second frequency shifter shifting the interpolated real and imaginary components to output a second output signal having a zero frequency corresponding to a second frequency, wherein the second output signal is used for determining the third phase error;
a first pair of pre-filters extracting only redundancy information from the first output signal, the first error detector detecting the first phase error and the second error detector detecting the second phase error using the real and imaginary components of the first output signal; and
a second pair of pre-filters extracting only redundancy information from the second output signal, the third error detector detecting the third phase error using the real and imaginary components of the second output signal.

28. The circuit of claim 27, wherein the received digital signal data includes a pilot signal and an information-containing signal,
wherein the redundancy information is associated with the pilot signal, the first output signal with its zero frequency corresponding to the first frequency, and the second output signal with its zero frequency corresponding to the second frequency,
wherein the first output signal is a signal in a lower overlapped region, where a lower portion of the information-containing signal overlaps a replica of the information-containing signal, and
wherein the second output signal is a signal in an upper overlapped region, where an upper portion of the information-containing signal overlaps a replica of the information-containing signal.

29. A circuit for recovering a carrier phase and a symbol timing in received digital signal data, the circuit comprising:
an error detector generating a first phase error;
means for generating a second phase error;
means for generating a third phase error, wherein the third phase error is equal to the second phase error;
a first addition/subtraction unit determining a carrier phase offset value as a function of the first, second, and third phase errors; and
a second addition/subtraction unit determining a symbol timing offset value as a function of the first, second, and third phase errors;
wherein a desired sampling time instant and carrier phase offset are detected at a point where an output of the first addition/subtraction unit and an output of the second addition/subtraction unit are both zero, so as to simultaneously recover the carrier phase and the symbol timing in the received digital signal data,
wherein the first and second addition/subtraction units detect a point where mean values of the first, second, and third phase errors are simultaneously zero by using feedback,
wherein the first addition/subtraction unit multiplies at least one of the first, second, and third phase errors with a respective constant before adding the first, second, and third phase errors, and
wherein the second addition/subtraction unit multiplies at least one of the first, second, and third phase errors with the respective constant before adding the first phase error to the second phase error to obtain an addition result and subtracting the third phase error from the addition result.

30. The circuit of claim 29, wherein the received digital signal data includes a pilot signal and an information-containing signal,
wherein the error detector detects the first phase error based on the pilot signal,
wherein the means for generating the second phase error detects the second phase error based on data in a lower overlapped region, where a lower portion of the information-containing signal overlaps a replica of the information-containing signal, and
wherein the means for generating the third phase error detects the third phase error based on data in an upper overlapped region, where an upper portion of the information-containing signal overlaps a replica of the information-containing signal.

31. The circuit of claim 29, wherein the first addition/subtraction unit determines the carrier phase offset value by multiplying the second phase error by a first constant to obtain a multiplied second phase error, multiplying the third phase error by a second constant to obtain a multiplied third phase error, and adding the first phase error, multiplied second phase error, and multiplied third phase error, and
wherein the second addition/subtraction unit determines the symbol timing offset value by multiplying the second phase error by the first constant to obtain the multiplied second phase error, multiplying the third phase error by the second constant to obtain the multiplied third phase error, adding the first phase error and the multiplied second phase error to obtain an addition result, and subtracting the multiplied third phase error from the addition result.

* * * * *